United States Patent Office 3,392,463
Patented July 16, 1968

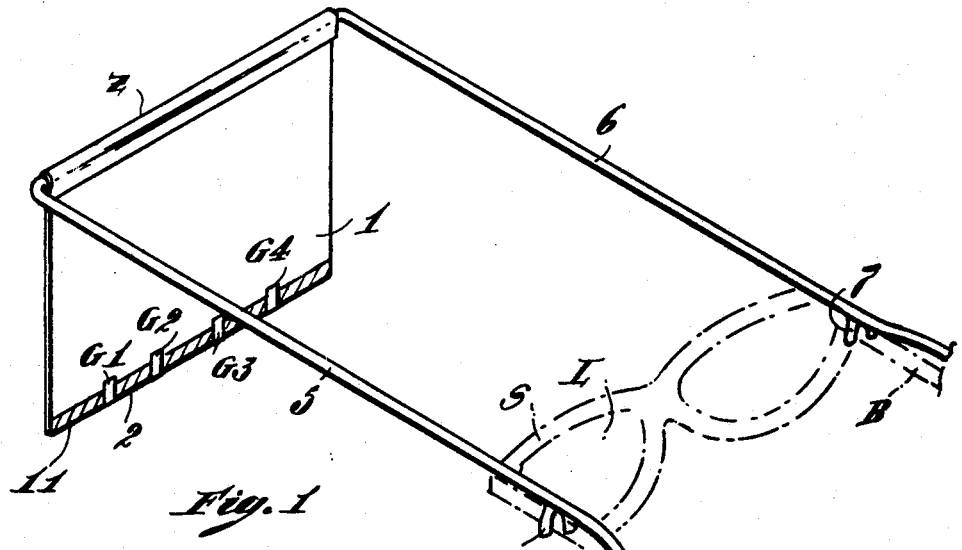

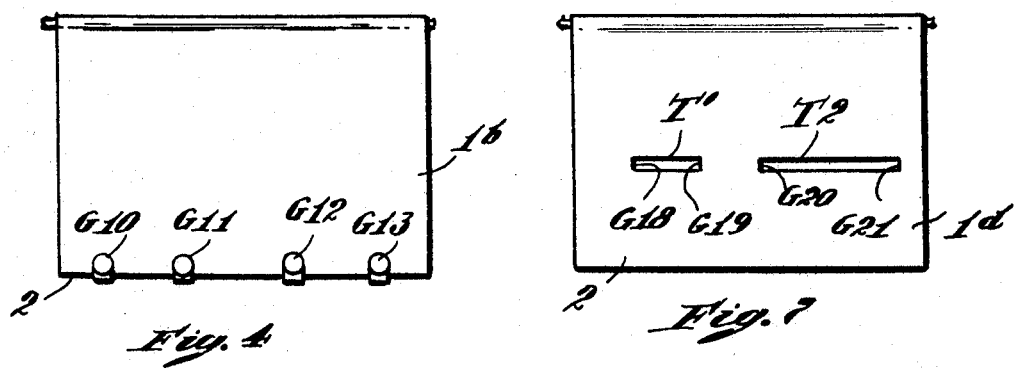
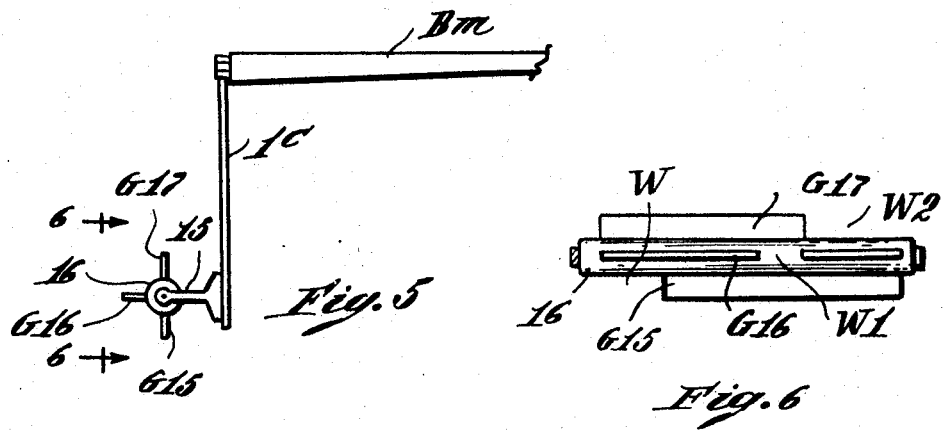
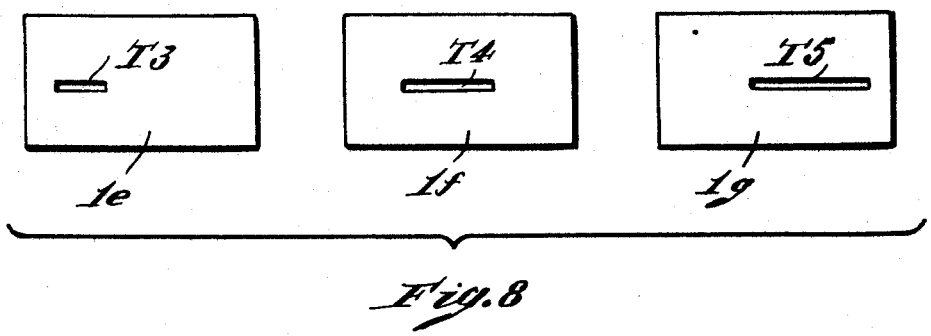

3,392,463
APPLIANCE FOR USE IN REMEDIAL READING
Jack Hachigian, 140 Sunset Ave.,
Amherst, Mass. 01002
Filed Jan. 13, 1966, Ser. No. 520,465
12 Claims. (Cl. 35—35)

ABSTRACT OF THE DISCLOSURE

Appliance to be worn by a reader for use in remedial reading comprising a light occluding member supported from the reader's head in his field of vision. The light occluding member has a plurality of spaced marking elements to provide points of reference to divide a line of type into groups of words.

---

This invention pertains to the art of remedial reading and more especially to a simple appliance designed for use by the individual reader to assist in concentrating his attention upon a selected group of words, so that, before transferring his attention to another group he will have absorbed the meaning of the first group. In the attainment of the desired result the present invention provides a device which is desirably attached to the user's head, for example, in a manner similar to that of securing spectacles in place so that it will partake of the movement of the wearer's head as he shifts his line of vision along the printed page. In its simplest form, this device may comprise a piece of stiff opaque material having a rectilinear lower edge and with spaced marking elements at or adjacent to this lower edge which, when the device is placed in the line of vision of the user and so that its lower edge is interposed between two adjacent lines of type as viewed by the user, the spaced spots (usually three) will give the eye definite points of reference which divide a line of type into groups of words, the center of each group being indicated by a spot. Thus the user will see a group of words segregated from the other words in the same line while the lines of type above said edge will be completely concealed from view.

Desirably, the spaced guide elements will be adjustable along the lower edge of the device (here referred to as a "card") so as to include between them a greater or lesser number of words and they may also be so arranged as to assist the user in transferring his gaze from one group of words to the next in the same line. Thus, for example, these guide elements may be spring clips or like elements which grip the lower margin of the card but which are readily movable, either by sliding them along the lower margin or by removing them and shifting them to another position. It is contemplated that if the user does not wear ordinary spectacles for reading, the device of the present invention may comprise a simple light-weight frame having hinged bows like those of spectacles, but particularly designed to hold a card or similar device having guide elements at its lower edge as above suggested. On the other hand, if the device be designed for use by a person who wears spectacles while reading, then the card may be supported by elements somewhat resembling spectacle bows, but which are designed to engage the bows of the spectacles worn by the user and to be supported by the spectacle bows while holding the card at such a distance in front of the spectacle lenses that the guide elements on the lower edge of the card will be visible when viewed against the line of type.

The guide elements which assist the user in segregating a group of words from others in the same line may be no more than spots of distinctive color in the lower margin of the card; they may be removable clips such as above suggested; they may be the opposite ends of a narrow slit within the card which, in that case, would not only obscure the type above the line being studied but also that below said line; they might be the side edges of indentations in the lower edge of the card; or they might be tiny electric lamps or motor-driven shutters such, for example, as automatically to shift the field of view from phrase to phrase along the line and thus to encourage more rapid reading.

In the accompanying drawings,

FIG. 1 is a diagrammatic perspective view showing a very simple embodiment of the invention arranged for use in association with ordinary spectacles;

FIG. 2 is a similar view but showing a device in accordance with the present invention, designed for use by a person who does not wear spectacles;

FIG. 3 is a section, to larger scale, on the line 3—3 of FIG. 2, showing a type of clip which may be employed;

FIG. 4 is an elevation, diagrammatic in character, showing a rectangular member generally similar to the card of FIG. 1, and whose lower edge is the reading edge, but wherein the guide elements are small electric lamps which may be lighted successively under the control of a motor-driven switch (not shown) of variable speed type, calibrated for different numbers of words per minute so that the user will be encouraged to transfer his gaze from phrase to phrase of a given line by those lights which, at any time, are lighted according to the selected reading speed;

FIG. 5 is a fragmentary edge elevation of a device which may be referred to as a "card" supported by spectacle bows or other means (not shown) and having mounted on its rear side a motor-driven rotatable drum 16 having radial fins projecting from its surface which, as the drum rotates, are displayed successively beneath the lower edge of the card, these fins being so spaced as to provide windows W, W¹, W², which as the drum rotates successively expose fractional portions of the line of type which is within the user's line of vision;

FIG. 6 is a plan view of the drum of FIG. 5;

FIG. 7 is an elevation of a card to be used like the card of FIG. 1, but wherein, instead of guide elements at the lower edge of the card, the card has narrow slots of various lengths whose end edges constitute the guide elements; and FIG. 8 is a composite view showing a group of interchangeable cards wherein the several cards of the group have narrow slots of different lengths respectively.

Referring to the drawings and, in particular, to FIG. 1, the numeral 1 designates an element, which, for convenience, is here referred to as a "card" and which in fact may, if desired, be a rectangular piece of stiff cardboard, or any other appropriate stiff sheet material, for example a synthetic plastic, but which, in any event, should be opaque and light in weight. As here shown, the card 1 is rectangular, having the rectilinear lower edge 2, hereafter referred to as the "reading edge." This card may, for example, be approximately 4 inches in width for use in average book reading, although a card of this size is useful, as well, in reading newsprint. The vertical height of the card might be as small as ¾-inch but preferably it should be greater than ¾ of an inch but not more than 5 inches.

As illustrated, the card is attached at its upper edge to a supporting frame comprising an elongate tubular bar Z, and a length of stiff metal wire, for instance stainless steel, which passes through the bar Z and is bent to provide members 5 and 6 each provided, near its free or rear end, with downwardly and upwardly directed forks 7 and 9 respectively, which are designed to engage the bows B of conventional spectacles S having the lenses L. With this arrangement the card 1 is supported at a distance forwardly of the lenses L such that when the device is in use and the reader is directing his attention to a printed page, the reading edge 2 may be positioned so as to appear between two lines of type. Desirably, since this lower edge may be somewhat out of focus, the lower margin 11 of the card is made distinctive, for example, by a color or texture contrasting with that of the body of the card.

Guide elements $G^1$, $G^2$, $G^3$ and $G^4$ are arranged near the lower edge of the card, desirably extending down or below the lower edge, and these guide elements are desirably relatively movable for adjustment so that their spacing, relative to each other, may be varied in accordance with the desire of the user and with reference to the size of the print and length of the phrase which is to be segregated from the remainder of the printed line. The outer two of these guide elements will be referred to herein as the "first and third guide elements" while the middle two are desirably so adjusted that, due to paralax, they appear to the user as one spot equidistant from the outer two.

In FIG. 2 a further embodiment is shown, wherein the card 1a is supported by a frame comprising a single length 10 of stiffly resilient metal wire or equivalent material comprising a portion which extends along the upper edge of the card and which has downwardly directed U-bends 13 and 14 which are so devised that the card may be slipped between the bends of a pair which then resiliently grip the card. The opposite end portions of this length of wire are shaped to provide integral bows $B^2$. A member M connecting the bows is designed to rest on the wearer's nose. In this instance the guide elements $G^5$ and $G^6$ are bent metal clips having the opposed legs 15 and 16 (FIG. 3) which resiliently engage the opposite faces of the card so that the clips are securely held in position by friction but may be slipped longitudinally of the edge 2 to dispose them in desired relative position.

In FIG. 4 the card 1b, having the reading edge 2 and which for example, may be supported, when in use, like the card 1 of FIG. 1, is provided at its lower edge with tiny electric lamps $G^{10}$, $G^{11}$, $G^{12}$ and $G^{13}$ which may be supplied with current from a small battery (not here shown) secured to the backside of the card and with provision, if desired, for automatically lighting the several lamps in sequence, for example to light lamp $G^{10}$; then to extinguish lamp $G^{10}$ and light lamps $G^{11}$ and $G^{12}$; and then to extinguish lamps $G^{10}$, $G^{11}$ and $G^{12}$ and light lamp $G^{13}$, in this way to encourage the user to accustom himself to reading more rapidly phrase-by-phrase.

In FIGS. 5 and 6, the card 1c is shown in edge elevation and provided with bows $Bm$ (only one of which is shown) supporting it and with brackets 15 projecting from its rear side and supporting a rotatable drum 16 from which project fins $G^{15}$, $G^{16}$ and $G^{17}$. These fins are of a radial width such that when a fin is in the position of the fin $G^{15}$ (FIG. 6) it conceals all of the printed line below the drum except the portion exposed at the window W. Thus, by turning the drum step-by-step, the reader may view successive portions, only, of the line as permitted by the windows W, $W^1$ and $W^2$. Obviously, a lesser or greater number of windows may be provided. This drum 16 may be turned manually or by suitable mechanical means (not here shown) as desired.

In FIG. 7 the card 1d, which may be provided with supporting bows B (not shown), instead of having guide elements at its lower edge 2, has vertically narrow slots $T^1$ and $T^2$ of different lengths whose lower edges are the "reading" edges and whose end edges $G^{18}$, $G^{19}$, $G^{20}$ and $G^{21}$ are the guide elements which determine the length of the phrase to be viewed at any given time. With this arrangement the phrase to be read is segregated not only from those in the same line but also from any portion of the adjacent lines of type either above or below.

In FIG. 8 a group of cards 1e, 1f and 1g is shown, the several cards having slots $T^3$, $T^4$ and $T^5$ respectively, like the slots of the card 1d (FIG. 7), and may be selectively substituted, for example, for the card 1a of FIG. 2, so that beginning with card 1e and progressing with cards 1f and 1g the user may extend the field to be viewed as his skill increases.

As above suggested, this appliance is designed to aid the reader to accomplish two things: (a) prevent reading lines of print which have already been read, by the blocking action of the opaque reading edge and (b) giving the reader spot positions upon which the eye movements are to stop in order to encourage to read phrases rather than individual words.

The reading edge is moved from line to line by slight movements of the head (which rate can be adjusted according to the reader's desire) thereby blocking out from view the previous line of material.

The four guide elements are adjusted for spot reading as follows:

The center two spots are moved so that to the eyes of the user they appear as one spot in the center of the reading material. The outer two are then adjusted a little way away from the center spot but not to the edges of the material. In this way there are three spots upon which to guide the movements of the eyes for phrase reading.

These adjustments having been made but once, the reader then begins reading at the top of the printed paper, forcing his eyes to stop only at the prepositioned spots, during the reading of each successive line. The first line being completed the head is moved slightly to block the completed line and the eyes are placed at the furthest spot to the left and the reading of the second line is begun.

While certain desirable embodiments of the invention have been herein illustrated and described by way of example, it is to be understood that the invention is broadly inclusive of any and all modifications falling within the scope of the appended claims.

I claim:

1. An appliance for use in remedial reading comprising a light occluding member having a substantially rectilinear edge, and means attachable to the reader's head for supporting said member in the reader's field of vision at a distance from the reader's eyes, so exceeding the usual distance between a spectacle lens and the eyes of the wearer of the spectacle, that said edge of the light occluding member will appear, without substantial blur, to lie between two consecutive lines of type on the printed page, and guide elements so spaced apart along said edge as to segregate a selected group of words in the lower of said lines thereby to induce the reader to concentrate his attention upon said words as a group before transferring his gaze to other words in said line.

2. An appliance according to claim 1, wherein the light occluding member is a piece of thin stiff sheet material and the means for supporting it comprises a frame including substantially rigid bows, and means for attaching the upper part of the light occluding member to said frame.

3. An appliance according to claim 2, further characterized in that the bows are designed to engage and be supported by the bows of conventional spectacles.

4. An appliance according to claim 2, wherein the frame comprises bows spaced apart and having curved ends for engagement with the user's ears, and a crossbar uniting said bows and which is designed to rest upon the wearer's nose.

5. An appliance according to claim 1, further characterized in that the light occluding member is a substantially rectangular card having a rectilinear lower edge and the guide elements are located at the lower marginal portion of said card, further characterized in that the supporting means is such that the light occluding member partakes of the movements of the reader's head.

6. An appliance according to claim 5, wherein the lower marginal portion of the card is of a distinctive appearance from the remainder of the card thereby to emphasize the location of the lower edge of the card.

7. An appliance according to claim 1, further characterized in that the guide elements are relatively adjustable longitudinally of said rectilinear edge thereby to vary the length of the segregated portion of the printed line.

8. An appliance according to claim 1, wherein the rectilinear edge of the light occluding member is the edge of a long and vertically narrow slot in the light occluding member, and the guide elements are the end edges of said slot.

9. An appliance according to claim 1, further characterized in that the guide elements are light sources spaced apart along said rectilinear edge.

10. An appliance for use in remedial reading comprising a light occluding member and means whereby said member may be supported in the reader's field of vision between the reader's eyes and a printed page, said light occluding member having a substantially rectilinear edge which, when the device is in use, will be so positioned within the reader's field of vision that said edge will appear to lie between two consecutive lines of type on the printed page, and guide elements so spaced apart along said edge as to segregate a selected group of words in the lower of said lines thereby to induce the reader to concentrate his attention upon said words as a group before transferring his gaze to other words in said line, further chracterized in that the guide elements are spaced radial fins projecting from a rotary drum located at the rear side of the light occluding member, the drum being rotatable whereby selected fins may be disposed, at will, to conceal corresponding portions of the line of type.

11. An appliance according to claim 1, and wherein the light occluding member is a substantially rectangular piece of cardboard, further characterized in that the supporting frame comprises means whereby the cardboard is removably attached to the frame.

12. An appliance according to claim 11, further characterized in having a plurality of light occluding elements having reading edges of different lengths respectively and which are selectively attachable to the supporting frame.

References Cited

UNITED STATES PATENTS

| | | | |
|---|---|---|---|
| 2,162,766 | 6/1939 | Taylor | 35—35.2 |
| 2,535,243 | 12/1950 | Taylor | 35—35.2 |

FOREIGN PATENTS 785,224 10/1957 Great Britain.

EUGENE R. CAPOZIO, *Primary Examiner.*

W. GRIEB, *Examiner.*